United States Patent Office 3,705,097
Patented Dec. 5, 1972

3,705,097
PROCESS AND CATALYST FOR REDUCING
SULFUR IN HYDROCARBONS
Billy D. Head, Angelton, Edward A. Fraini, Lake Jackson, and George R. Martin, Freeport, Tex., assignors to The Dow Chemical Company, Midland, Mich.
No Drawing. Filed Jan. 28, 1971, Ser. No. 110,670
Int. Cl. C10g 23/04
U.S. Cl. 208—217
10 Claims

ABSTRACT OF THE DISCLOSURE

A crude feedstock containing sulfur impurities is desulfurized i.e. reduced in sulfur content, by reacting the feedstock with excess hydrogen over a fluidized catalyst comprising magnesium oxide and a Group VIII metal oxide on a refractory support wherein the Group VIII metal content is in the range from 1–10 percent and the magnesium content is in the range from 5–25 percent both based on the total weight of catalyst.

BACKGROUND OF THE INVENTION

This invention relates to a process for the catalytic desulfurization of a crude feedstock containing sulfur impurities and the catalyst therefor.

It is known from Pat. 3,169,918 that crude feedstocks can be desulfurized over a catalyst comprising the combination of a Group VI metal, with an iron group metal, and a platinum group metal.

It is also known from the French Pat. 1,559,842 to Gignier dated Feb. 3, 1969, that sulfur containing hydrocarbon feedstocks can be reformed at or near atmospheric pressure over a catalyst consisting of nickel oxide, magnesium oxide, zirconium oxide, and silica or alumina in the presence of 0.5 to 3 mols of water per carbon atom of the hydrocarbon.

SUMMARY OF THE INVENTION

It now has been surprisingly discovered that crude feedstocks containing sulfur impurities such as organic mercaptans, organic sulfides, organic disulfides, thiophenes and the like can be desulfurized with a catalyst comprising a Group VIII metal oxide with magnesium oxide.

Generally, the invention comprises a process and catalyst for reducing sulfur impurities in a crude hydrocarbon stream which comprises reacting, at a temperature in the range from 450–525° C. and a pressure in the range from 300–4000 pounds per square inch gage, a crude hydrocarbon stream with excess hydrogen in the presence of a fluidized catalyst having diameters in the range from 5–1000 microns and comprising a mixture of magnesium oxide and a Group VIII metal oxide on a support of alumina, silica, or mixtures thereof having the Group VIII metal content in the range from 1–10 percent and the magnesium content in the range from 5–25 percent both based on the total weight of the catalyst and recovering the hydrocarbon stream having a substantially reduced sulfur content.

More specifically, the invention comprises the steps of (1) mixing hydrogen with the hydrocarbon stream so that the molar ratio of hydrogen to hydrocarbon is in the range from 2:1 to 15:1,
(2) heating the hydrocarbon-hydrogen mixture to a temperature in the range from about 300° to about 400° C.
(3) passing the hydrocarbon-hydrogen mixture upwardly through a catalyst bed having diameters in the range from 5–1000 microns at a rate of about 0.1 to about 5.0 volumes of said hydrocarbon per volume of catalyst per hour to fluidize the bed, wherein the temperature is maintained in the range from 450°–525° C. and the pressure is maintained in the range from 300–4000 pounds per square inch gage, and wherein said catalyst comprises a mixture of magnesium oxide and a Group VIII metal oxide on a support of alumina, silica, or mixtures thereof having a Group VIII metal content in the range 1–10 percent and a magnesium content in the range 5–25 percent both based on the total weight of the catalyst, and
(4) separating the liquid hydrocarbon stream from the resultant hydrogen sulfide gas.

DETAILED DESCRIPTION

The process of this invention is applicable to the treatment of lower boiling fractions of crude oil such as fuel, reduced crude oil, residuum having a high or a low sulfur content to reduce the sulfur content thereof.

The process is dependent upon the use of a supported magnesium oxide-Group VIII metal oxide catalyst having 5–25 percent magnesium and 1–10 percent of the Group VIII metal. The preferred range of magnesium is 10–18 percent and the preferred range of the Group VIII metal is 3–5 percent.

Examples of the Group VIII metals that may be used in proper combination with the magnesium are cobalt, nickel, iron, palladium, platinum, rhodium, ruthenium, and osmium.

The catalysts of this invention are generally prepared by dissolving an aqueous salt of magnesium in water along with an aqueous salt of a Group VIII metal. The solution is used to impregnate a refractory microsphere carrier which is then dried in an oven for 10–25 hours. The dry catalyst is then heated to a temperature in the range 200–600° C. to decompose the salts into the corresponding oxides.

A specific illustration of the magnesium-nickel catalyst preparation involves dissolving 55.3 grams of magnesium nitrate and 10.9 grams of nickel nitrate in 50 ml. of water, impregnating 56.5 grams of a silica-alumina microsphere carrier containing 50 percent by weight silica and 50 percent by weight alumina. The wet mass was then dried in an oven for 16 hours. The dried catalyst was finally heated for 8 hours at a temperature of 280–300° C. to produce the mixed oxide catalyst. The other catalyst of this invention can be prepared in a similar manner.

In the process of desulfurization, hydrogen gas is continuously mixed with the sulfur bearing crude hydrocarbon stream in a conventional mixer so that the ratio of hydrogen to hydrocarbon is in the range from 2:1 to 15:1 and the preferred ratio is from 4:1 to 10:1. The mixture is then pumped into a preheater to raise the temperature thereof to a range from about 350°–425° C. After the preheating, the mixture is pumped into a pressurized reactor containing the aforementioned catalysts so that the catalyst is fluidized and at a rate of 0.1–5.0 volumes of hydrocarbon per volume of catalyst per hour. The preferred liquid hourly space velocity (LHSV) is 1.0–2.0.

The pressure maintained in the reactor is within the range 300–4000 pounds per square inch gage (p.s.i.g.) with the preferred range being 2000–3000 p.s.i.g.

The temperature of the reactor is maintained in the range 450–525° C. with the preferred range being 475–500° C.

Under the foregoing conditions at least 90% of the undesired sulfur compounds in the hydrocarbon stream were removed as hydrogen sulfide gas which can be treated by known processes to recover sulfur as a by-product.

The invention is further illustrated by the following examples.

Example 1

Petroleum residuum containing 0.31% sulfur was desulfurized by mixing it with 4 moles of hydrogen per mole residuum, preheating to 400° C., and passing it through a pressurized reactor containing a mixed catalyst of nickel oxide and magnesium oxide supported on a silica-alumina microsphere carrier.

The nickel content was 3.8% and the magnesium content was 16.8% based on the total weight of the catalyst.

The carrier consisted of 50 percent alumina and 50 percent silica and had an average particle size of about 50 microns.

The temperature of the reactor was maintained at 475° C. and the pressure was maintained at 2000 p.s.i.g.

Hydrogen sulfide was generated in the reactor which was then separated from the liquid hydrocarbon stream in a high pressure separator.

The desulfurized product was analyzed by coulometric titration which indicated a 91% reduction in the sulfur content was achieved.

A related cobalt-molybdenum catalyst having 3.5% Co and 10.0% Mo under the same conditions on the same support also gave a 91% reduction.

It was totally unexpected to find that the catalyst containing the relatively cheap metal magnesium, from a different group in the Periodic Table, was substantially equivalent to the known cobalt-molybdenum catalyst.

Substantially the same results can be obtained when the nickel oxide in the above catalyst is replaced by other Group VIII metal oxides such as cobalt, iron, palladium, platinum, rhodium, ruthenium and osmium.

We claim:

1. The process for reducing sulfur impurities in a crude hydrocarbon stream containing same which comprises reacting, at a temperature in the range from 450–525° C. and a pressure in the range from 300–4000 pounds per square inch gage, a crude hydrocarbon stream with excess hydrogen in the presence of a fluidized catalyst having dimensions in the range from 5–1000 microns and comprising a mixture of magnesium oxide and a Group VIII metal oxide on a refractory support having the Group VIII metal content in the range from 1–10 percent and the magnesium content in the range from 5–25 percent both based on the total weight of the catalyst and recovering the hydrocarbon stream having a substantially reduced sulfur content.

2. The process as set forth in claim 1 in which hydrogen is supplied in the molar ratio to hydrocarbon in the range from 2:1 to 15:1.

3. The process as set forth in claim 1 in which the refractory support is alumina, silica or mixtures thereof.

4. The process as set forth in claim 1 in which the crude hydrocarbon stream is contacted with the catalyst at a rate of about 0.1 to 5.0 volumes of hydrocarbon per volume of catalyst per hour.

5. A process for reducing sulfur impurities in a crude hydrocarbon stream which comprises the steps of (a) mixing hydrogen with the hydrocarbon stream so that the molar ratio of hydrogen to hydrocarbon is in the range from 2:1 to 15:1, (b) heating the hydrocarbon-hydrogen mixture to a temperature in the range from about 300° to about 400° C., (c) passing the hydrocarbon-hydrogen mixture upwardly through a catalyst bed having dimensions in the range from 5–1000 microns at a rate of about 0.1 to about 5.0 volumes of hydrocarbon per volume of catalyst per hour to fluidize the bed, wherein the temperature is maintained in the range from 450°–525° C. and the pressure is maintained in the range from 300–4000 pounds per square inch gage, and wherein said catalyst comprises a mixture of magnesium oxide and a Group VIII metal oxide on a refractory support having a Group VIII metal content in the range 1–10 percent and a magnesium content in the range 5–25 percent both based on the total weight of the catalyst, and (d) separating the liquid hydrocarbon stream from the resultant hydrogen sulfide gas.

6. The process as set forth in claim 5 in which the refractory support is alumina, silica, or mixtures thereof.

7. The process as set forth in claim 5 wherein the catalyst has a Group VIII metal content in the range from 3–5 percent and the magnesium content is in the range 10–18%.

8. A catalyst for reducing sulfur impurities in a crude hydrocarbon stream when heated therewith at a temperature in the range from 450–525° C. and under a pressure in the range from 300–4000 pounds per square inch gage consisting of a mixture of magnesium oxide and a Group VIII metal oxide supported on a support of alumina, silica, or mixtures thereof having dimensions in the range from 5–1000 microns wherein the Group VIII metal content is in the range from 1–10 percent and the magnesium content is in the range 5–25 percent both based on the total weight of the catalyst.

9. A catalyst as set forth in claim 8 wherein the Group VIII metal content is in the range from 3–5 percent and the magnesium content is in the range 10–18%.

10. A catalyst as set forth in claim 9 wherein the Group VIII metal is nickel.

References Cited

UNITED STATES PATENTS

| | | | |
|---|---|---|---|
| 3,125,511 | 3/1964 | Tupman et al. | 208—217 |
| 3,054,833 | 9/1962 | Donaldson et al. | 208—217 |
| 3,530,066 | 9/1970 | Kuwata et al. | 208—217 |
| 3,542,672 | 11/1970 | Chonoré et al. | 208—217 |
| 3,600,301 | 8/1971 | Rausch | 208—217 |
| 3,607,728 | 9/1971 | Wilhelm | 208—217 |

JAMES E. POER, Primary Examiner

F. W. BELLAMY, Assistant Examiner